(12) United States Patent
Monsifrot et al.

(10) Patent No.: US 10,120,987 B2
(45) Date of Patent: Nov. 6, 2018

(54) DEVICE AND METHOD FOR EXECUTING PROTECTED IOS SOFTWARE MODULES

(71) Applicant: THOMSON LICENSING, Issy les Moulineaux (FR)

(72) Inventors: Antoine Monsifrot, Rennes (FR); Charles Salmon-Legagneur, Rennes (FR); Alain Durand, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 152 days.

(21) Appl. No.: 15/374,372

(22) Filed: Dec. 9, 2016

(65) Prior Publication Data

US 2017/0169196 A1    Jun. 15, 2017

(30) Foreign Application Priority Data

Dec. 10, 2015    (EP) ................................. 15306971

(51) Int. Cl.
*G06F 21/14*        (2013.01)
*G06F 8/71*         (2018.01)

(52) U.S. Cl.
CPC ............. *G06F 21/14* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 7,805,710 B2 | 9/2010 | North | |
| 7,996,685 B2 | 8/2011 | Jin et al. | |
| 8,650,303 B1 | 2/2014 | Lang et al. | |
| 9,032,207 B2 * | 5/2015 | Onno | H04N 5/262 380/205 |

(Continued)

FOREIGN PATENT DOCUMENTS

| | | |
|---|---|---|
| EP | 2674892 | 12/2013 |
| WO | WO2014191968 | 12/2014 |

OTHER PUBLICATIONS

Biondi et al., "Silver Needle in the Skype", BlackHat Europe, Amsterdam, Netherlands, Mar. 2, 2006, pp. 1-98.

(Continued)

*Primary Examiner* — Peter Poltorak
(74) *Attorney, Agent, or Firm* — Brian J. Dorini; Patricia A. Verlangieri

(57) ABSTRACT

A device comprising a hardware processor and memory storing an application of an application package comprising a first version and a second version of the application, the first version being intended to be executed on a genuine device and the second version on a jailbroken device. The hardware processor determines a jailbreak status of the device, i.e. genuine or jailbroken and derives a key based on at least the jailbreak status. In case the device is genuine, the hardware processor deciphers using the key at least a first part of the first version and executes, the first version using the first deciphered part, for example a jump table used to execute CFG flattened code. In case the jailbreak status is jailbroken, the hardware processor deciphers using the key at least a first part of the second version and executes the second version using the second deciphered part, for example comprising executable instructions.

10 Claims, 3 Drawing Sheets

(56) References Cited

U.S. PATENT DOCUMENTS

| | | | |
|---|---|---|---|
| 9,317,689 B2* | 4/2016 | Aissi | G06F 21/30 |
| 9,787,681 B2* | 10/2017 | Clancy, III | H04L 63/10 |
| 9,792,439 B2* | 10/2017 | Colnot | G06F 21/575 |
| 2003/0009744 A1* | 1/2003 | Doyle | G06F 8/423 |
| | | | 717/120 |
| 2008/0199006 A1* | 8/2008 | Gandolph | G06F 21/10 |
| | | | 380/201 |
| 2010/0260270 A1* | 10/2010 | Kapoor | H04N 21/23439 |
| | | | 375/240.27 |
| 2012/0144384 A1* | 6/2012 | Baek | G06F 11/3013 |
| | | | 717/173 |
| 2013/0268997 A1* | 10/2013 | Clancy, III | G06F 21/53 |
| | | | 726/1 |
| 2013/0312058 A1* | 11/2013 | Thompson | G06F 21/54 |
| | | | 726/1 |
| 2014/0007117 A1* | 1/2014 | Sima | G06F 9/448 |
| | | | 718/102 |
| 2014/0011478 A1* | 1/2014 | Collins | H04L 43/00 |
| | | | 455/411 |
| 2014/0020072 A1* | 1/2014 | Thomas | H04L 63/0815 |
| | | | 726/7 |
| 2014/0040630 A1* | 2/2014 | Swaminathan | G06F 21/10 |
| | | | 713/187 |
| 2014/0082373 A1* | 3/2014 | Colnot | G06F 21/572 |
| | | | 713/193 |
| 2014/0101765 A1* | 4/2014 | Jakobsson | G06F 21/566 |
| | | | 726/23 |
| 2014/0157355 A1* | 6/2014 | Clancy, III | G06F 21/53 |
| | | | 726/1 |
| 2014/0237545 A1* | 8/2014 | Mylavarapu | H04L 63/1433 |
| | | | 726/3 |
| 2014/0351911 A1* | 11/2014 | Yang | H04L 63/0838 |
| | | | 726/7 |
| 2015/0007259 A1* | 1/2015 | Peterson | G06F 21/54 |
| | | | 726/1 |
| 2015/0052595 A1* | 2/2015 | Murphy | G06F 21/44 |
| | | | 726/7 |
| 2015/0120572 A1* | 4/2015 | Slade | G06Q 20/3224 |
| | | | 705/73 |
| 2016/0065410 A1* | 3/2016 | Brunet | H04L 41/0846 |
| | | | 709/221 |
| 2016/0117153 A1* | 4/2016 | Salmon-Legagneur | |
| | | | G06F 8/433 |
| | | | 717/155 |
| 2016/0231806 A1* | 8/2016 | Gu | G06F 1/3296 |
| 2017/0353500 A1* | 12/2017 | Jacobsen | H04L 63/102 |

OTHER PUBLICATIONS

Zdziarski, "Hacking and Securing iOS Applications", O'Reilly Media Inc., Sebastopol, California, USA, Jan. 13, 2012, pp. 1-356.

Wurster et al., "A generic attack on checksumming-based software tamper resistance", IEEE Symposium on Security and Privacy, Oakland California, USA, May 8, 2005, pp. 127-138.

Wang et al., "Protection of Software-based Survivability Mechanisms", International Conference on Dependable Systems and Networks, Goteborg, Sweden, Jul. 1, 2001, pp. 273-282.

Collberg et al., "A Taxonomy of Obfuscating Transformations", Department of Computer Science, University of Auckland, Technical Report No. 148, Jul. 1997, pp. 1-36.

European Search Report for European Patent Application No. EP15306971, dated Jun. 15, 2016, pp. 1-7.

* cited by examiner

DEVICE AND METHOD FOR EXECUTING PROTECTED IOS SOFTWARE MODULES

CROSS-REFERENCE

This application claims the benefit under 35 U.S.C. § 119 of European Patent Application No. 15306971.1, filed Dec. 10, 2015, herein incorporated by reference.

TECHNICAL FIELD

The present disclosure relates generally to software protection and in particular to protection of software to be run on iOS.

BACKGROUND

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

iOS applications are protected against reverse engineering by encrypted distribution from the originator to the iOS device on which they are to be installed. Once installed on the iOS device, the iOS itself protects the applications against dynamic analysis using isolation of processes and separation of privileges.

However, the protection only applies to iOS devices that have not been jailbroken. It is easy to use a GNU debugger (gdb) to dump the code of an application from a jailbroken device, as explained by Jonathan Zdziarski in "Hacking and Securing iOS Applications". A jailbroken device has been modified in order to obtain increased privileges that are not available on a device that has not been jailbroken.

It is thus not sufficient to rely on the protection provided by the iOS. But since the iOS does not allow any code modifications within installed applications, the only software protection mechanisms that can be used are integrity checks and Control Flow Graph (CFG) flattening, both of which are commonly used together. These software protection mechanisms are often needed since the encryption provided by the iOS is weak and the application also is vulnerable to reverse engineering using static analysis.

Then again, CFG flattening is only efficient against static attacks, not dynamic attacks, and Wurster et al. have shown that it is possible to circumvent integrity checks by running two code sections parallel, as described in "A Generic Attack on Checksumming-Based Software Tamper Resistance."

It will be appreciated that it is desired to have a solution that overcomes at least part of the conventional problems related to protection of iOS applications. The present principles provide such a solution.

SUMMARY OF DISCLOSURE

In a first aspect, the present principles are directed to a method for executing code of an application of an application package comprising a first version and a second version of the application. The first version is intended to be executed on a genuine device and the second version is intended to be executed on a jailbroken device. In a device, at least one hardware processor determines a jailbreak status of the device, computes an integrity value for the code, and derives a decryption key based on at least the jailbreak status and the integrity value. In case the jailbreak status indicates that the device is genuine, the at least one hardware processor decrypts, using the decryption key, at least a first part of the first version stored in a memory of the device to obtain a first processed part, and executes, using the first processed part, the first version. In case the jailbreak status indicates that the device is jailbroken, the at least one hardware processor decrypts, using the decryption key, at least a second part of the second version stored in the memory to obtain a second processed part, and executes the second processed part.

Various embodiments of the first aspect include:
  That the first part comprises a jump table, which can be for use with Control Flow Graph flattened code. The jump table can be stored in a data section of the first version of the application.
  That the second part comprises enciphered executable instructions.

In a second aspect, the present principles are directed to a device for executing code of an application. The device comprises memory storing an application package comprising a first version and a second version of the application, the first version being intended to be executed on a genuine device and the second version being intended to be executed on a jailbroken device. The device further comprises at least one hardware processor configured to: determine a jailbreak status of the device, compute an integrity value for the code, and derive a decryption key based on at least the jailbreak status and the integrity value. In case the jailbreak status indicates that the device is genuine, the at least one hardware processor decrypts, using the decryption key, at least a first part of the first version stored in the memory of the device to obtain a first processed part, and executes, using the first processed part, the first version. In case the jailbreak status indicates that the device is jailbroken, the at least one hardware processor decrypts, using the decryption key, at least a second part of the second version stored in the memory to obtain a second processed part, and executes the second processed part.

Various embodiments of the second aspect include:
  That the first part comprises a jump table, which can be for use with Control Flow Graph flattened code. The jump table is stored in a data section of the first version of the application.
  That the second part comprises enciphered executable instructions.

In a third aspect, the present principles are directed to a method for generating an application package for an application. A device processes using first information a first version of the application intended to be executed on a genuine device to obtain a first processed version, processes using second information a second version of the application intended to be executed on a jailbroken device to obtain a second processed version, generates an information derivation function, the information derivation function deriving, based on a jailbreak status, the first information when executed by a genuine device and the second information when executed by a jailbroken device, and generating the application package comprising the first processed version, the second processed version, a jailbreak detection function determining the jailbreak status of an apparatus executing the jailbreak detection function and a key derivation function.

In a fourth aspect, the present principles are directed to a computer program product which is stored on a non-transitory computer readable medium and comprises program code instructions executable by a processor for implementing the steps of a method according to any claim of the first aspect.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 1:
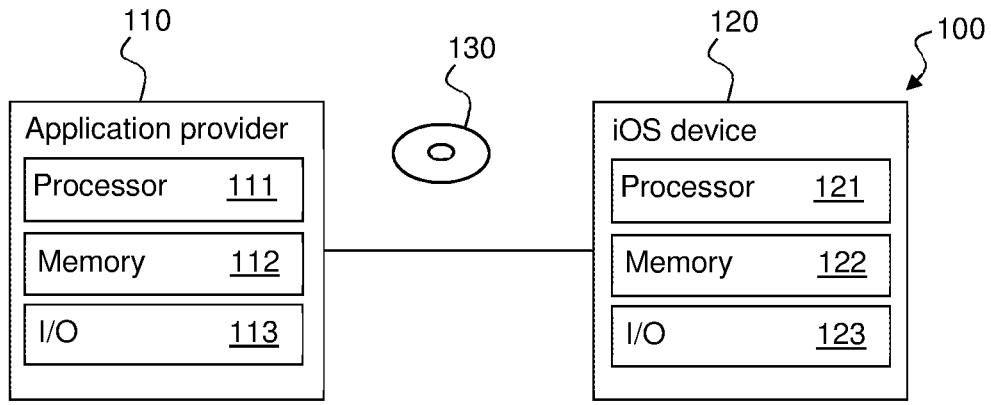
FIG. 1 illustrates a system implementing the present principles.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In the description, reference will be made to a module. This module includes executable code and can be a shared library, a portion of code inside an executable or a library, or even an entire application.

On genuine devices (i.e., devices that have not been jailbroken), user modules (i.e. modules downloaded by the user) run non-root. Debugging attacks are countered by the operating system, which applies default encryption, process isolation (sandboxing) for applications, and forbids attachment of debuggers from non-root applications. As the iOS provides protection against dynamic attacks, it may be sufficient for the application provider 110 to provide, in the code of the version for genuine devices itself, protection against static analysis, for example using CFG flattening or code obfuscation. In addition, integrity checks can be used to protect the module.

On jailbroken devices, debugging or dynamic attacks are not prevented by the iOS, but at the same time, the modified system privileges of the iOS—such as the broken sandbox isolation, created by the jailbreak—enable the use of low-level software protections mechanisms, like dynamic code encryption (self-modifying code) and anti-debugging. This makes it possible for the application provider to include such software protection mechanisms in the version for jailbroken devices. The version for jailbroken device can thus be protected against dynamic attacks using for example dynamic ciphering and integrity checks.

FIG. 1 illustrates a system 100 implementing the present principles. The system 100 includes an application provider 110 configured to generate and provide, directly or indirectly, an iOS module to an iOS device 120 configured to execute the iOS module. The application provider 110 and the iOS device 120 includes at least one hardware processing unit ("processor") 111, 121, memory 112, 122 and at least one communications interface 113, 123 configured to communicate with the other device. The skilled person will appreciate that the illustrated devices are very simplified for reasons of clarity; as such, features like internal connections and power supplies are not illustrated. Non-transitory storage medium 130 stores the iOS module as further described hereinafter.

According to the present principles, the processor 121 of an iOS device 120 executing protected code decrypts some elements of the code using a key dynamically computed by a key-derivation function. The key-derivation function derives the key from at least the state of the device (genuine or jailbroken).

Preferably, a computed integrity value for the code is also used to derive the key. Binding the key derivation function to the integrity of the code can counter some tampering attacks on the jailbreak detection function. For instance, if an attacker on a jailbreak device tampers the jailbreak detection function to execute the part corresponding to the genuine device, the obtained key $K_{jb1}$ will not be correct and the jump table will not be deciphered.

At a given point during execution, the key can thus take one of two different values ($K_{g1}$ or $K_{jb1}$) according to the device state.

The state of the device is defined by several criteria and those criteria are used to change the value of a key. As is known in the art, a jailbreak detection function is capable of determining if the device on which it is executed is a genuine device or a jailbroken device. Since forking is not allowed on genuine devices, a jailbreak detection function can for example use fork( ) and check the returned process id to see if it has successfully forked, in which case it can be determined that the device is jailbroken. Similarly, calling system( ) with a null argument returns 1 on a jailbroken device and 0 on a genuine device, which also can enable determination of a jailbreak. Other jailbreak detection functions are described by Zdziarski in "Hacking and Securing iOS Applications". It is preferred that the jailbreak detection function use a plurality of different methods of detecting a jailbreak in order to increase its robustness.

On a jailbroken device the key $K_{jb1}$ is used for code ciphering. In other words, enciphered executable instructions are deciphered for execution. How to perform dynamic code decryption is well known in the art and will not be described in detail. Examples of solutions may be found in EP 2674892 and in "Silver Needle in the Skype" by Philippe Biondi and Fabrice Desclaux.

On a genuine device the key $K_{g1}$ is used to decipher a jump table used for CFG flattening. The jump table is stored in data section to be compliant with the iOS anti self-modifying code protection on genuine devices.

Each version—i.e., the version to be executed on a genuine device and a jailbroken device—implements the same functionality.

It will thus be seen that an attacker who has a genuine device cannot guess the key for deciphering the part of the application corresponding to a jailbroken device, and vice versa.

A possible implementation is to use an application launcher. When executed, the application launcher first computes the deciphering key $K_{g1}$ or $K_{jb1}$ in dependence on the state of the device and then deciphers at least one portion of the code or one portion of the jump table as described hereinbefore. Finally the application launcher launches the module of the application corresponding to the device state.

To increase the robustness, it can be interesting to use the described technique several times during the execution of the application. For example each version of the code can be divided in several chunks that are shuffled together. Using different implementations, the execution of a jailbreak detection function and derivation of a key ($K_{gn}$ or $K_{jbn}$) can be repeated before deciphering either the next chunk of code to be executed, or a portion of the jump table used by the next chunk.

To make the system more secure, it is possible to protect the jailbreak detection function itself with CFG flattening.

Figure 2:
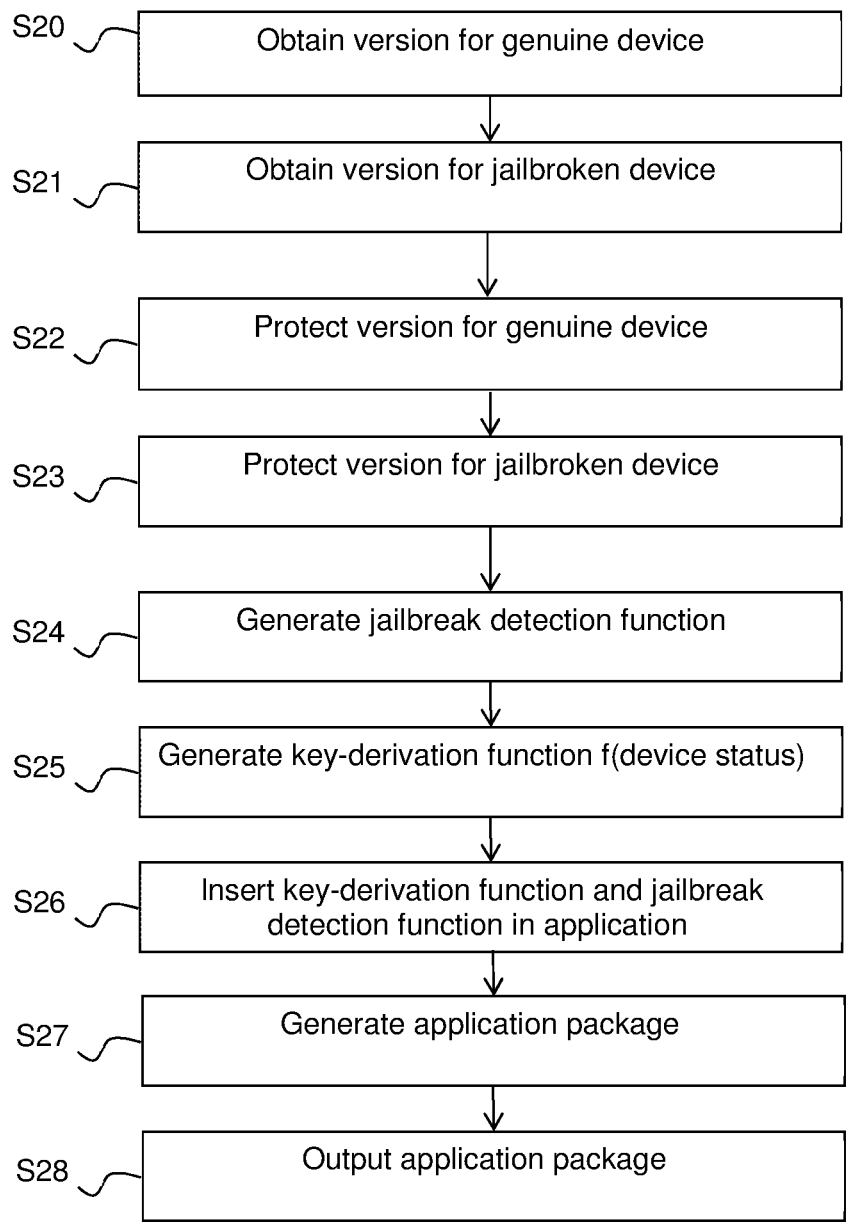
FIG. 2 illustrates a method of generating a protected application according to the present principles.

FIG. 2 illustrates a method of generating a protected module according to the present principles. In step S20, the application provider obtains a version of the module to be executed on genuine devices and, in step S21, a version of the module to be executed on jailbroken devices. Each version refers only to itself (i.e. not to the other version) and is protected using specific software protection mechanisms depending on whether it is intended to be executed by a jailbroken device or a genuine device.

In step S22, the application provider 110 applies at least CFG flattening to the version for genuine devices and enciphers the jump table to obtain a protected version for genuine devices and, in step S23, the application provider 110 applies at least software ciphering to the version for jailbroken devices to obtain a protected version for jailbroken devices. It is also possible that the versions obtained in steps S20 and S21 were already protected using these software protection methods when the versions where obtained.

The application provider 110 then generates, in step S24, a jailbreak detection function and, in step S25, a key-derivation function described hereinbefore.

It is noted that the key-generation function can be configured to fit a determined key (as in FIG. 2) or that the key can be determined by the key-generation function. In the latter case, steps S22 and S23 have to take place once the key-derivation function has been generated (and the keys derived).

As already mentioned, the jailbreak detection function and the key-derivation function can be inserted into the application loader, into the application, or both.

The application provider 110 then inserts, in step S26, the at least one jailbreak detection functions and key-derivation functions into the application, and generates, in step S27, an application package including the application with the at least one jailbreak detection functions and key-derivation functions. In step S28, the application provider 110 outputs the application package, either directly to the iOS device 120 or to an intermediate store (not shown).

Figure 3:
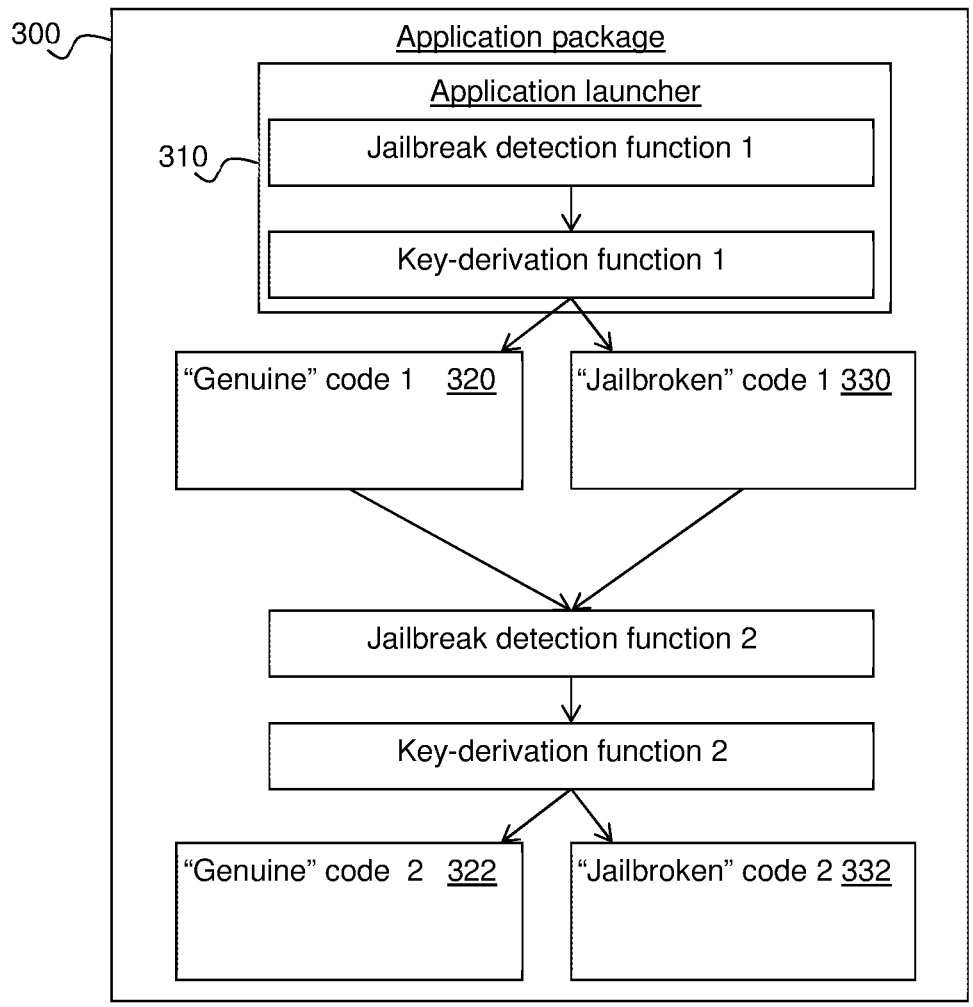
FIG. 3 illustrates an application package according to the present principles.

FIG. 3 illustrates an exemplary application package 300 according to the present principles comprising an application launcher 310 with a first jailbreak detection function configured to determine the jailbreak status of the executing device, a first key-derivation function configured to generate a key based on at least the state of the executing device, a function for deciphering part of the application, as already described, and then call the first "genuine" code version 320 or the first "jailbroken" code version 330 of the application.

The application package 300 further comprises a second jailbreak detection function, a second key-derivation function, a further function for deciphering a further part of the application, and then call the second "genuine" code version 322 or the second "jailbroken" code version 332 of the application.

Figure 4:
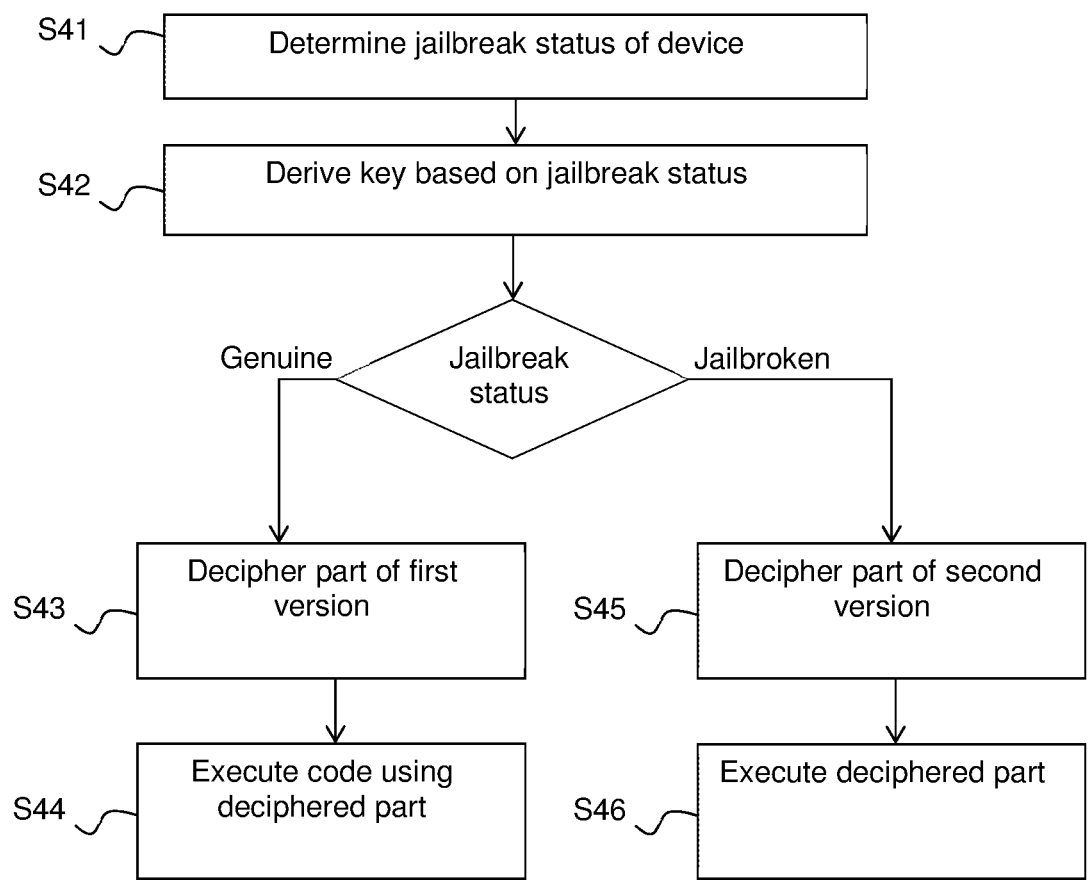
FIG. 4 illustrates a method of executing an application according to a preferred embodiment of the present principles.

FIG. 4 illustrates a method of executing an application according to a preferred embodiment of the present principles.

The memory 122 of the device 120 illustrated in FIG. 1 stores an application of an application package comprising a first version and a second version of the application. The first version is intended to be executed on a genuine device and the second version is intended to be executed on a jailbroken device.

In step S41, the hardware processor 121 determines a jailbreak status of the device, i.e. genuine or jailbroken. In step S42, the hardware processor derives a key based on at least the jailbreak status. As has already been described, the key can be derived also from for example an integrity code.

In case the jailbreak status is genuine, the hardware processor deciphers, in step S43, using the key at least a first part of the first version and executes, in step S44, the first version using the first deciphered part. As mentioned, the first part can be an enciphered jump table that is needed to execute the CFG flattened code of the first version.

In case the jailbreak status is jailbroken, the hardware processor deciphers, in step S45, using the key at least a part of the second version and executes, in step S46, the second version using the deciphered part. The part of the second version can comprise enciphered executable instructions.

It will thus be appreciated that the present principles provide a solution for software protection of iOS software modules that, at least in certain cases, can improve on the conventional protection methods.

The present principles have been described for use with iOS as it is believed that this is where they can provide the most interesting use. However, it will be understood that the present principles can be used for other (secure) operating systems such as Android, especially if they limit writing permissions in the memory pages.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method for executing code of an application of an application package comprising a first version and a second version of the application, the first version intended to be executed on a genuine device and the second version intended to be executed on a jailbroken device, the method comprising in a device:
    determining by at least one hardware processor a jailbreak status of the device;
    computing by the at least one hardware processor an integrity value for the code;
    deriving by the at least one hardware processor a decryption key based on at least the jailbreak status and the integrity value; and
in case the jailbreak status indicates that the device is genuine:
    decrypting by the at least one hardware processor using the decryption key at least a first part of the first version stored in a memory of the device to obtain a first processed part; and
    executing, by the at least one hardware processor using the first processed part, the first version; and
in case the jailbreak status indicates that the device is jailbroken:
    decrypting by the at least one hardware processor using the decryption key at least a second part of the second version stored in the memory to obtain a second processed part; and
    executing by the at least one hardware processor the second processed part.

2. The method of claim 1, wherein the at least first part comprises a jump table.

3. The method of claim 2, wherein the jump table is used with Control Flow Graph flattened code.

4. The method of claim 2, wherein the jump table is stored in a data section of the first version of the application.

5. The method of claim 1, wherein the second part comprises enciphered executable instructions.

6. A device for executing code of an application, the device comprising:
    memory storing an application package comprising a first version and a second version of the application, the first version intended to be executed on a genuine device and the second version intended to be executed on a jailbroken device; and
    at least one hardware processor configured to:
        determine a jailbreak status of the device;
        compute an integrity value for the code;
        derive a decryption key based on at least the jailbreak status and the integrity value; and
        in case the jailbreak status indicates that the device is genuine:
            decrypt, using the decryption key, at least a first part of the first version stored in the memory of the device to obtain a first processed part; and
            execute, using the first processed part, the first version; and
        in case the jailbreak status indicates that the device is jailbroken:
            decrypt, using the decryption key, at least a second part of the second version stored in the memory to obtain a second processed part; and
            execute the second processed part.

7. The device of claim 6, wherein the at least first part comprises a jump table.

8. The device of claim 7, wherein the jump table is used with Control Flow Graph flattened code.

9. The device of claim 7, wherein the jump table is stored in a data section of the first version of the application.

10. The device of claim 6, wherein the second part comprises enciphered executable instructions.

* * * * *